Figure 1:
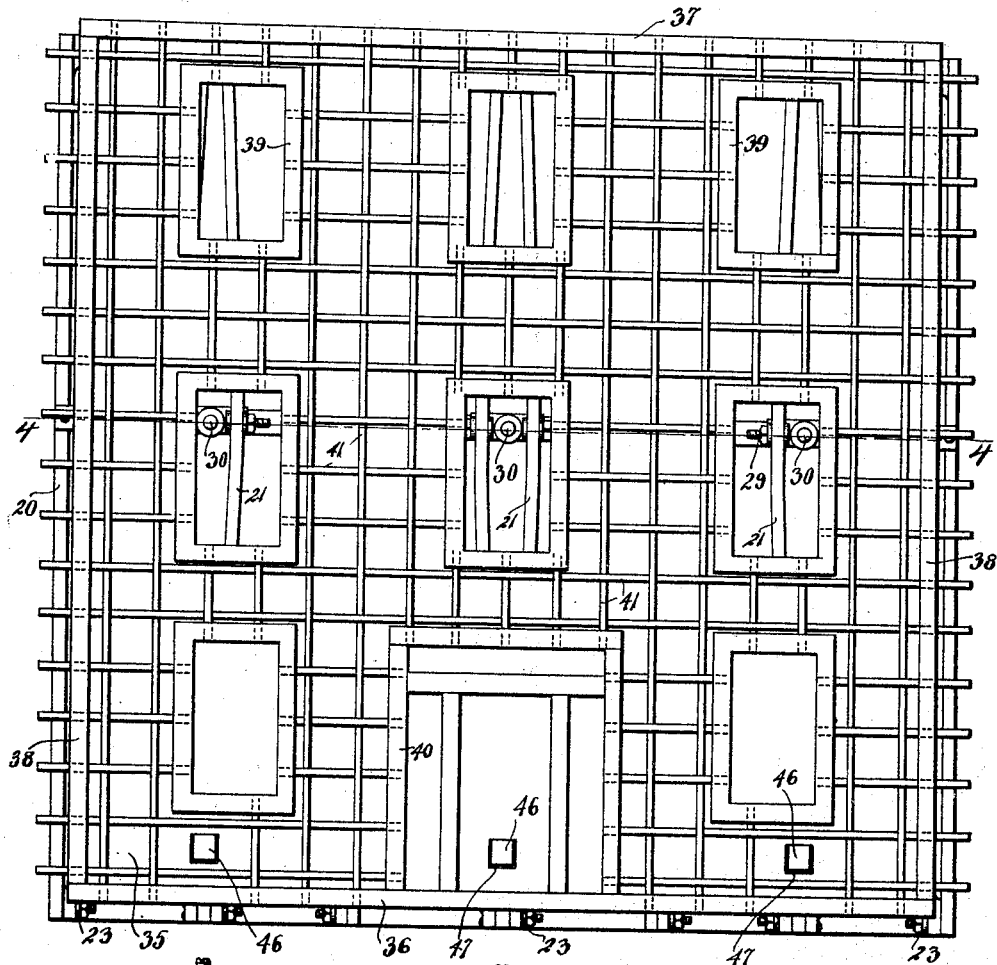

May 19, 1925.  
P. N. HUNTER  
BUILDING APPARATUS  
Filed Nov. 7, 1923

1,538,815  
6 Sheets-Sheet 1

P. N. Hunter  
INVENTOR  
BY  
ATTORNEY  
WITNESS:

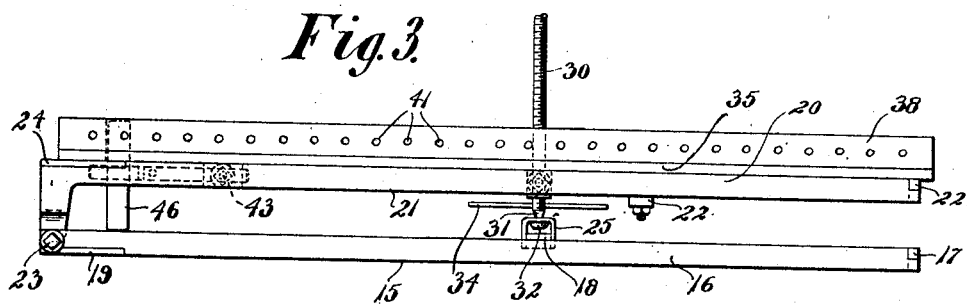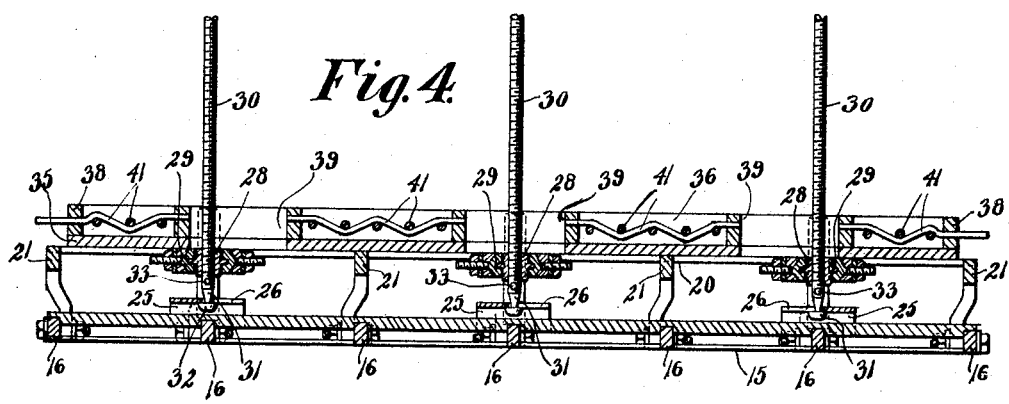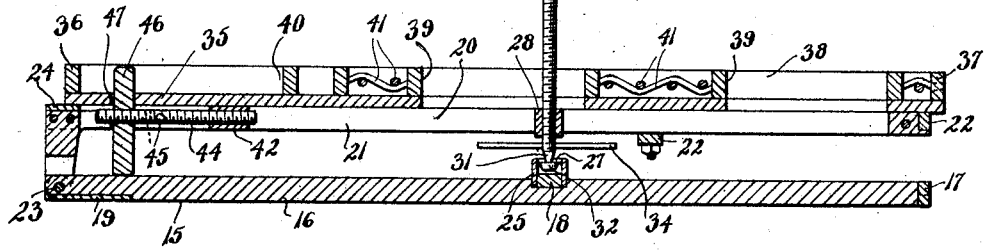

May 19, 1925.  1,538,815
P. N. HUNTER
BUILDING APPARATUS
Filed Nov. 7, 1923   6 Sheets-Sheet 3
Fig. 6.
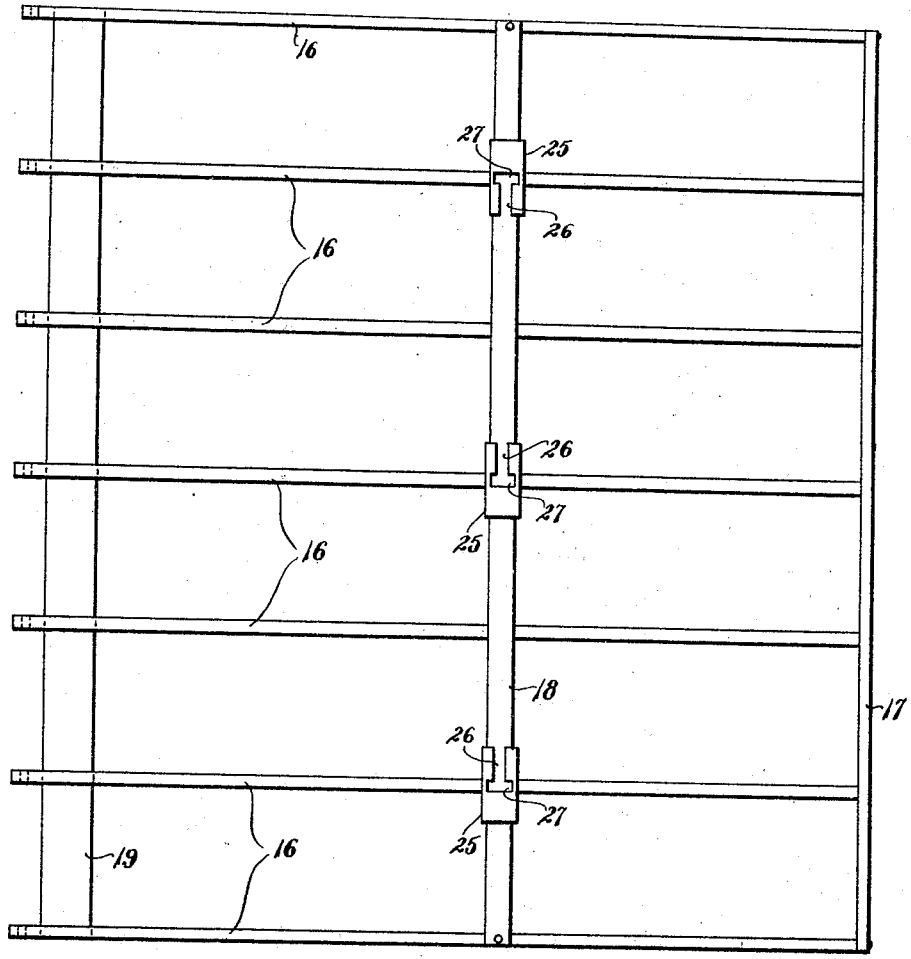
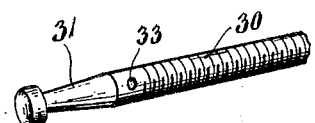
Fig. 13.
P. N. Hunter.
INVENTOR May 19, 1925.  
P. N. HUNTER  
BUILDING APPARATUS  
Filed Nov. 7, 1923
1,538,815
6 Sheets-Sheet 4
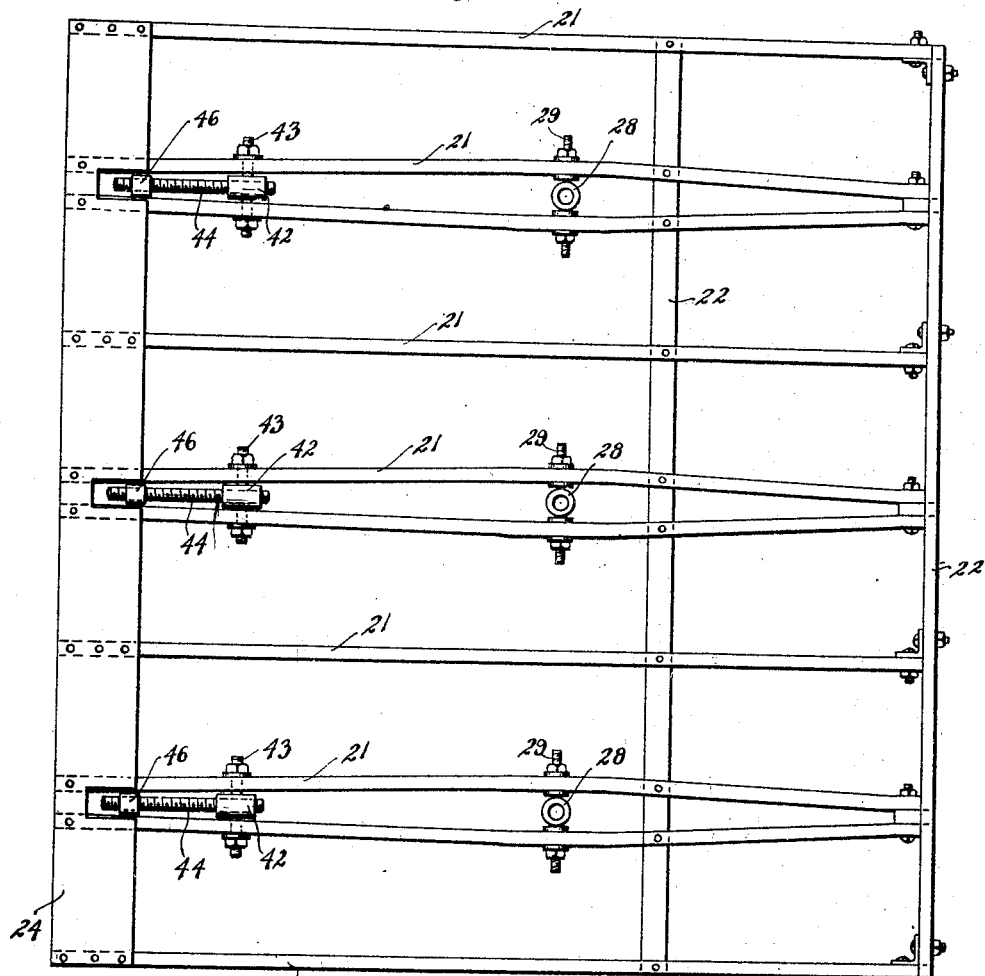
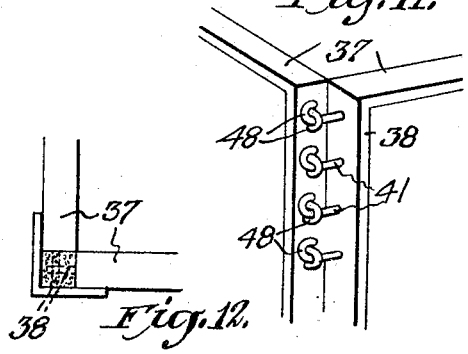
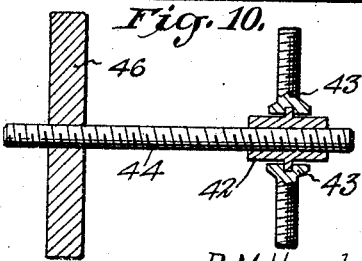
P. N. Hunter,
INVENTOR
BY Victor J. Evans,
ATTORNEY May 19, 1925.
P. N. HUNTER
1,538,815
BUILDING APPARATUS
Filed Nov. 7, 1923   6 Sheets-Sheet 5
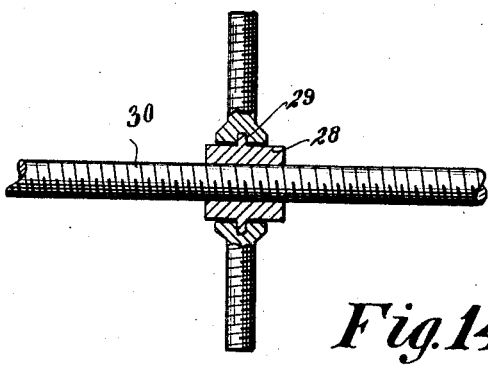
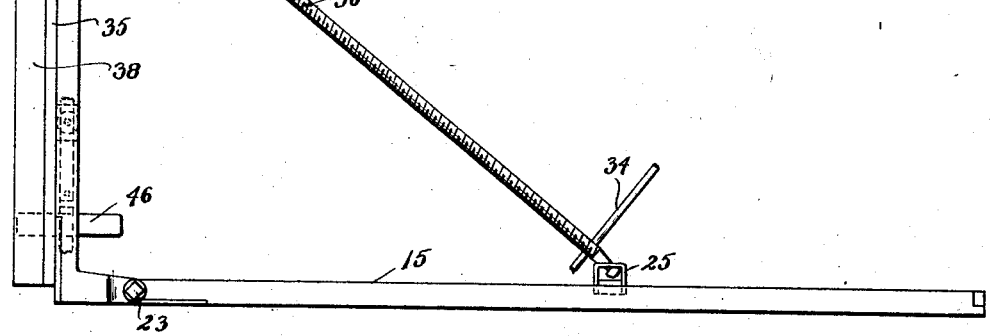
P. N. Hunter.
INVENTOR

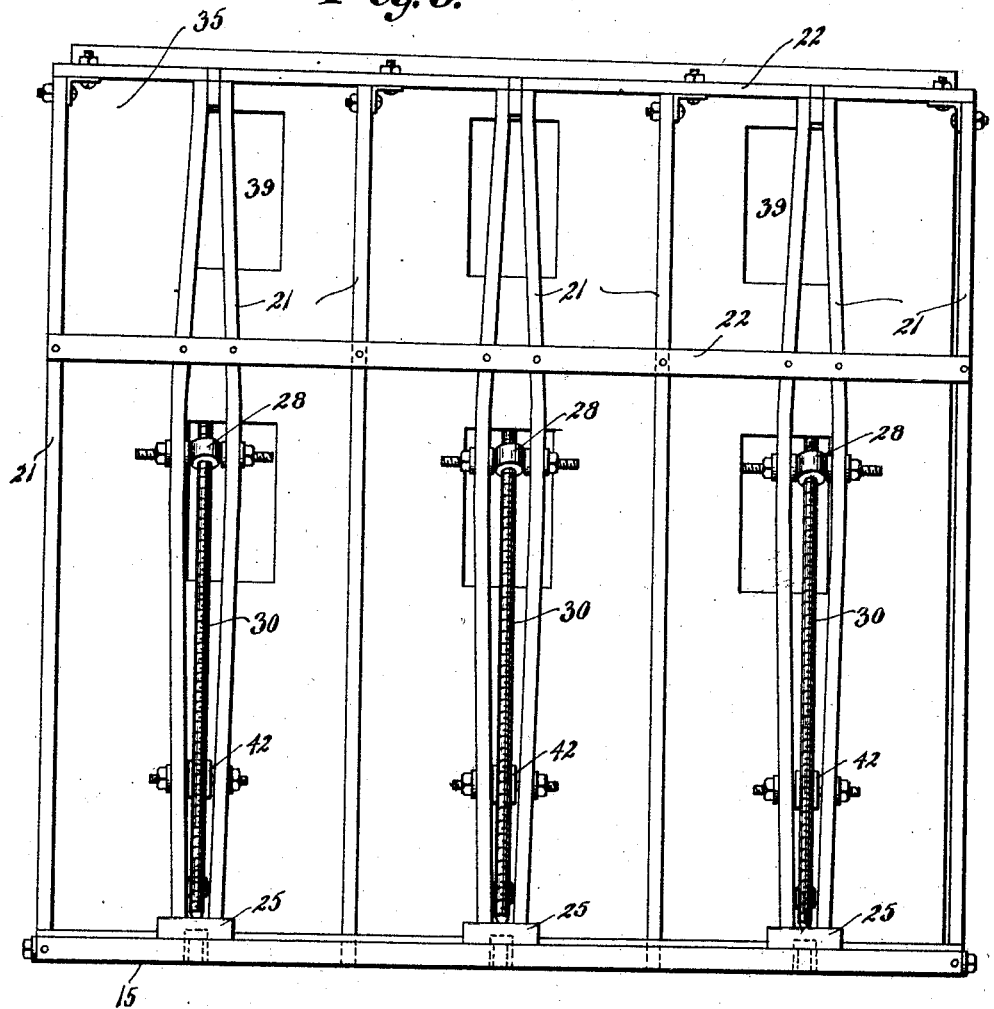

Patented May 19, 1925.

1,538,815

UNITED STATES PATENT OFFICE.

PERCIVAL N. HUNTER, OF SAWTELLE, CALIFORNIA.

BUILDING APPARATUS.

Application filed November 7, 1923. Serial No. 673,359.

*To all whom it may concern:*

Be it known that I, PERCIVAL N. HUNTER, a citizen of the United States, residing at Sawtelle, in the county of Los Angeles and State of California, have invented new and useful Improvements in Building Apparatus, of which the following is a specification.

This invention relates to apparatus for building houses of any kind and of widely different sizes, the distinct feature being that the walls are built while lying flat and are then subsequently raised to upright position and secured together already for the building of the floors therein and roof thereon, the door and window frames being built into the walls during their construction in horizontal position.

An important and more specific object is the provision of an apparatus of this character which includes a supporting frame, one element of which is disposed upon the ground and is designed to be stationary, and the other element of which, carrying the wall, is swingably mounted, the device including screw means for raising the swinging portion so as to carry with it the completed wall and raise it into upright position.

A further object is the provision of an apparatus of this character in which the movable portion of the frame carries a platform having a form thereon including door and window frames and provided with suitably supported intersecting reinforcing rods of any desired type, it being intended that this form be filled with cement subsequently to which it is raised to vertical position and the unnecessary parts removed for subsequent use.

Yet another object is the provision of an apparatus of this character which operates as a great saving of lumber inasmuch as the regular forms, scaffolding, etc. are unnecessary.

An additional object is the provision of an apparatus of this character which will be comparatively simple and inexpensive in manufacture, easy to use, a great time and labor saver and a general improvement in the art.

Figure 2:
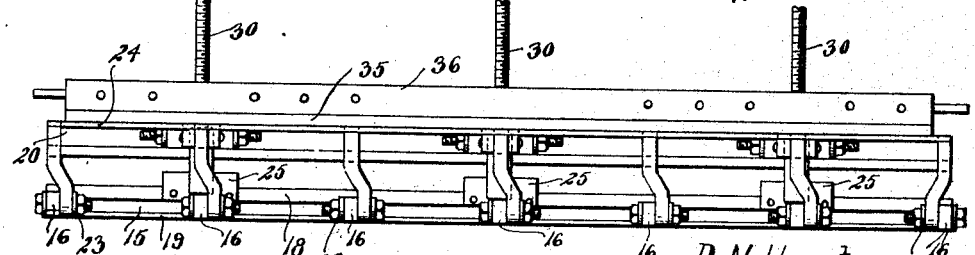

With the above and other objects and advantages in view the invention consists in the details of construction to be hereinafter more fully described and claimed and illustrated in the accompanying drawings, in which:

Figure 1 is a plan view of the device laid upon the ground and ready to have the cement poured into the form, Figure 2 is an end elevation, Figure 3 is a side elevation, Figure 4 is a cross section on the line 4—4 of Figure 1, this line of section being along the screw jacks, Figure 5 is a cross section at right angle to Figure 4 this view being taken along one of the screw jacks, Figure 6 is a plan view of the stationary frame member, Figure 7 is a plan view of the movable frame member, Figure 8 is a side elevation showing a completed wall raised into vertical position, Figure 9 is an elevation looking at the outside of the movable frame, Figure 10 is a detail vertical section showing one screw member for holding the lower portion of the wall, Figure 11 is a fragmentary perspective view illustrating the connection of the corners of the four walls, Figure 12 is a fragmentary plan view showing the meeting edges of two walls and showing the method of connecting them with the cement, Figures 13, 14 and 15 are detail views of the screw rods, trunnions and retaining members respectively.

Referring more particularly to the drawings I have shown my apparatus as consisting of a stationary frame 15 which is designed to be laid upon the ground along side of where a house is to be erected. It should of course be stated that prior to the erection of a house by my machine or apparatus the necessary supporting sills or foundation walls must be provided on which the walls are to be placed. The frame 15 is here illustrated as being rectangular in shape and constructed of any suitable number of longitudinal bars 16 connected by cross bars 17, 18 and 19, the intermediate one being designated by the numeral 18.

The apparatus further includes a similar frame 20 which consists of longitudinal bars 21 connected by cross bars 22, certain of the longitudinal bars being shown as being arranged in pairs. The frame 20 is pivotally or hingedly connected with the frame 15 as shown at 23 so that it may be swung vertically. Initially of course the frame 20 lies upon the frame 15 and is adapted to have built thereonto the wall which is subsequently to be raised into vertical position. For reinforcing purposes it may be preferable to provide the hinged edge of the frame 20 with a plate 24 which extends the full width as shown.

Secured upon the cross bar 18 of the frame 15 are inverted trough shaped retaining members 25 arranged in spaced relation as shown and each provided in its top with a longitudinal slot 26 leading into a socket 27 at its center. Located between the longitudinal bars 21 which are arranged in pairs, are nut members 28 disposed in the same relative positions as the trough members 25 and pivotally mounted by being provided with trunnions 29 which are journaled through the adjacent ones of the pairs of bars 21.

The means for raising the movable frame 20 and the wall structure to be built thereon as to be hereinafter described, consists of elongated screw rods 30 which are threaded through the nut members 28 and which are formed at one end with reduced necks 31 and heads 32 whereby they may be swivelly connected with the trough members 25, the screw rods being associated with the members 25 by sliding the neck portions 31 along the slots 26 until the heads 32 are received within the sockets 27. These rods are provided with transverse holes 33 through which are engaged bars 34 which constitute handles by means of which the screw rods may be turned for lifting the movable frame 20.

It is of course conceivable that a frame or other wall construction may be built onto the movable frame 20, though it is primarily intended that the wall construction be of cement. In carrying out this feature I provide a form which is built directly onto and supported by the movable frame 20. This form consists of a platform 35 at the edges of which are secured a sill 36, a top bar 37 and side bars 38. Any desired arrangement of window frames 39 and door frames 40 may be had and such frames are temporarily secured to the platform 35 by any suitable means such as nails or the like. I also provide a plurality of intersecting stay rods 41 which extend throughout this form and which are secured to the door and window frames with their outer ends passing through all the bars 36, 37 and 38 with their ends projecting considerably beyond the side bars 38. After this form is constructed, cement is poured thereinto flush with the peripheral bars and the door and window frames in the usual manner.

It should be mentioned at this point that also located between the pairs of bars 21 are nut members 42 rotatably mounted by means of trunnions 43 which pass through the adjacent ones of the pairs of bars. Passing through these nut members are screws 44 provided with transverse holes 45 for the insertion of a handle rod. Screwed onto the lower or free ends of the screws 44 are foot pieces 46 which project through notches in the plate 24 and which also project through openings 47 in the platform 35 of the wall construction, the purpose of these foot pieces being to prevent sliding of the wall mold or frame on the frame 20 when the latter is raised.

After the cement has set, the operators insert the bars 34 through the holes 33 in the screw rods 30 and then turn the screw rods in a counter-clockwise direction, it being of course apparent that all of the rods must be turned simultaneously and to the same extent. Owing to the fact that these rods are screwed through the nut members 28 it will be evident that the result will be to move the hinged frame 20 upwardly, carrying the completed wall with it. This is continued until the movable frame 20 and wall are in upright position with the lower sill 36 of the wall immediately above the foundation wall. If necessary any props may be used for maintaining this position temporarily until the other walls can be raised.

When the wall is thus raised it is quite apparent that it will still be slightly above the foundation walls and to effect lowering, it is necessary that the operator insert the handle bars 34 through the transverse holes 45 and then turn the screws 44 in a clockwise direction, all of the screws being naturally turned simultaneously. It is of course apparent that the completed wall is supported by the foot pieces 46 and when these screws 44 are turned the entire wall is allowed to descend and in this way it is placed on the foundation walls. As soon as the wall rests upon the foundation wall it is apparent that the strain upon the foot pieces 46 is relieved so that the screws 44 carrying the foot pieces 46 may be swung outwardly away from the movable frame 20 to disengage the foot pieces from the wall entirely.

All four walls are raised in exactly the same manner and they are connected by hooking together the projecting ends of the stay rods 41 as shown in one of the detail views, the hooks being designated by the numeral 48. When all four walls are plumb and thus hooked together by means of the stay rods, suitable troughs or funnel like members are disposed at the upper corners of the walls and concrete poured in to embed all the interengaging hooks 48 and in this way a very strong and rigid structure is produced. It should be stated that prior to the pouring of this cement at the corners and also prior to the formation of the hooks, the side bars 38 of the mold or frame should be removed while the top bar 37 is allowed to remain for the purpose of serving as a support for whatever roof structure is desired. The platform 35 is also removed and may be used subsequently in building another wall.

In actual practice it is further intended that balconies, chimneys and all other ornamentation on the walls be applied prior to the raising of the wall to its vertical position so that the work is done all at once and various subsequent steps or operations are unnecessary. From actual experimentation it has been discovered that a house can be constructed with my apparatus and by my method in far less time than is ordinarily consumed so that the device operates as a time and labor saver in addition to having the advantage of not requiring any elaborate mold, scaffolding or other structure of costly nature.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In an apparatus of the character described, a relatively stationary frame adapted for disposition in a horizontal position, a relatively movable frame hinged at one edge of the stationary frame, a mold carried by the movable frame, and adapted to have a wall built therein, a plurality of screw members removably connected with the stationary frame and extending through the natural openings in the wall mold and rotatable nut members swiveled upon the movable frame and engaged upon said screw members.

2. In an apparatus of the class described, a relatively stationary frame, a relatively movable frame hinged upon one edge thereof, a plurality of brackets mounted on the top of the stationary frame and formed with key-hole slots, a plurality of screw members having heads detachably engaged within said key-hole slots, and nut members swiveled upon the movable frame and engaged upon said screw members.

3. In an apparatus of the character described, a relatively stationary frame, a movable frame hinged upon one edge thereof, a form carried by the movable frame, a plurality of substantially U-shaped bracket members mounted on the stationary frame and formed with longitudinal slots opening out into transverse slots, a plurality of threaded rods associated with said brackets and having constricted end portions and heads, the constricted end portions being engaged within said slot whereby the heads will prevent disassociation therefrom, bearing members pivotally mounted within the movable frame, and nuts swiveled within said bearing members and engaged upon said threaded rods.

4. An apparatus of the character described comprising a stationary frame, a movable frame pivoted upon one edge thereof and adapted to have a wall built thereon, and screw means for swinging said movable frame into vertical position, and means on the movable frame for holding the wall structure against movement with respect thereto, said means consisting of screw members carried by the movable frame, nut means engaging said screw members, and foot pieces screwed upon the screw members and engageable by portions of the wall structure.

5. A building machine comprising a stationary frame, a movable frame hinged upon one edge thereof, a wall mold structure carried by said movable frame, projections carried by the movable frame and passing through openings in the mold structure for holding the latter against movement with respect to the movable frame, and means for swinging the movable frame into upright position.

6. A building apparatus comprising a stationary frame, a pivotally mounted frame at one edge thereof, a mold structure built onto said pivoted frame in substantially horizontal position, releasable screw carried projections mounted on the pivoted frame and engaging through openings in the mold structure for preventing movement thereof with respect to the pivoted frame, and screw means for raising the pivoted frame.

7. An apparatus of the character described comprising a stationary frame, a movable frame hinged at one edge thereof and adapted to have a wall built thereonto while in substantially horizontal position, nut members carried by trunnions pivoted in the movable frame, screw rods threaded through said nut members and having heads and constricted necks there adjacent, and a plurality of retaining members on the stationary frame formed with slots for the passage of said necks, the slots leading to sockets for the accommodation of said heads whereby said screw rods will be rotatable and swingable with respect to the stationary frame.

8. A machine of the character described comprising a stationary frame, a movable frame adapted to have a wall built thereonto, means for raising the movable frame, and means for holding the wall structure against movement with respect to the movable frame consisting of nut members pivoted on the movable frame, screw rods threaded through said nut members, and foot pieces screwed onto the free ends of said screw rods, the wall structure including a supporting platform provided with openings for the passage of said foot pieces.

In testimony whereof I affix my signature.

PERCIVAL N. HUNTER.